United States Patent
Barnard et al.

(10) Patent No.: US 7,057,993 B2
(45) Date of Patent: Jun. 6, 2006

(54) COPY PROTECTION USING MULTIPLE SECURITY LEVELS ON A PROGRAMMABLE CD-ROM

(75) Inventors: James A. Barnard, Scottsville, NY (US); Michael A. Inchalik, Pittsford, NY (US); Bruce L. Ha, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 983 days.

(21) Appl. No.: 09/772,149

(22) Filed: Jan. 29, 2001

(65) Prior Publication Data

US 2002/0144114 A1  Oct. 3, 2002

(51) Int. Cl.
*G11B 20/12* (2006.01)
*G11B 7/24* (2006.01)

(52) U.S. Cl. .................. 369/53.21; 713/165; 713/166; 713/167; 380/201; 380/202; 380/203; 369/59.25; 369/275.3

(58) Field of Classification Search ................ 713/166; 369/53.21, 59.25, 275.3, 47.12, 47.13
See application file for complete search history.

(56) References Cited

U.S. PATENT DOCUMENTS

| | | | |
|---|---|---|---|
| 4,644,493 A | 2/1987 | Chandra et al. | |
| 5,400,319 A | 3/1995 | Fite et al. | |
| 5,513,169 A | 4/1996 | Fite et al. | |
| 5,541,904 A | 7/1996 | Fite et al. | |
| 5,555,304 A | 9/1996 | Hasebe et al. | |
| 5,740,244 A | 4/1998 | Indeck et al. | |
| 5,745,568 A | 4/1998 | O'Connor et al. | |
| RE35,839 E | 7/1998 | Asai et al. | |
| 5,805,549 A | 9/1998 | Fite et al. | |
| 5,805,699 A | 9/1998 | Akiyama et al. | |
| 5,818,812 A * | 10/1998 | Moribe et al. | ........... 369/47.15 |
| 5,930,215 A | 7/1999 | Fite et al. | |
| 5,940,505 A | 8/1999 | Kanamaru | |
| 5,982,889 A | 11/1999 | DeMont | |
| 6,044,469 A | 3/2000 | Horstmann | |
| 6,097,814 A * | 8/2000 | Mochizuki | ................... 380/44 |
| 6,108,296 A * | 8/2000 | Kajiyama et al. | ........ 369/275.4 |
| 6,782,190 B1 * | 8/2004 | Morito | ........................ 386/94 |
| 6,907,184 B1 * | 6/2005 | Yokota et al. | ................. 386/52 |
| 2002/0004832 A1 * | 1/2002 | Yoon et al. | .................. 709/229 |

OTHER PUBLICATIONS

ECMA, ECMA-267, Dec. 1999, 2nd edition, Annex H and J.*

* cited by examiner

*Primary Examiner*—Ayaz Sheikh
*Assistant Examiner*—Brandon Hoffman
(74) *Attorney, Agent, or Firm*—Raymond L. Owens (57) ABSTRACT

A copy-protected optical disc, including a preformed identification number (ID) in the ATIP signal and the subcode which is impressed upon the optical disc and a number of other optical discs during optical disc manufacture, a unique identification number for the optical disc which was written on the optical disc after it is manufactured; and an encrypted program written onto the optical disc wherein the encryption of such program is based upon the preformed ID and the unique ID and includes two or more selectable security levels.

19 Claims, 8 Drawing Sheets

COPY PROTECTION USING MULTIPLE SECURITY LEVELS ON A PROGRAMMABLE CD-ROM

CROSS REFERENCE TO RELATED APPLICATIONS

Reference is made to commonly assigned U.S. patent application Ser. No. 09/772,333 (now abandoned) filed concurrently herewith, entitled "Copy Protection Using a Preformed ID and a Unique ID on a Programmable CD-ROM" by Barnard et al, U.S. Pat. No. 6,188,659 filed Dec. 15, 1998, entitled "Method for Insuring Uniqueness of an Original CD" by Mueller et al, and U.S. patent application Ser. No. 09/393,527 filed Sep. 10, 1999, entitled "Hybrid Optical Recording Disc with Copy Protection" by Ha et al; the disclosures of which are incorporated herein by reference.

FIELD OF THE INVENTION

The present invention relates to copy protection for information recorded on a compact disc or other optically recorded disc.

BACKGROUND OF THE INVENTION

Consumer purchase of optical discs that contain audio, video, software, or data has generated a multi-billion-dollar industry. Recently, the advent of low-cost optical recording media and drives has enabled widespread unauthorized copy of this content. To defeat this, various copy protection schemes have been proposed. However, some of those schemes rely on characteristics of the digital data stream, which can be copied by sophisticated low-cost recorders using bit-for-bit copying. Other schemes rely on changing the characteristics of the optical disc in ways that make it difficult to both write and read. Still other schemes rely on network connections or secondary "key" disc schemes that do not allow stand-alone protection.

Horstmann (U.S. Pat. No. 6,044,469) discloses a software protection mechanism with a Protector Module that reads a license file and executes code based upon the license that has been purchased. Thus, it protects software at the logical level, especially for parts of the software for which rights have not been granted. If this system were included on a compact disc, a reproduction of this disc using a standard CD writer would make a copy with all the existing access in place.

Asai et al (U.S. Re. 35,839) describes a method of using an identifier region on a compact disc to store data that is compared with data stored elsewhere on the disc to verify authenticity. While this protects the data on a logical level, a simple bit-for-bit copy of the disc would subvert this protection scheme.

DeMont (U.S. Pat. No. 5,982,889) teaches a method for verifying the authenticity of a user's access to information products. The disadvantage of this system is that authentication is done via a central site. The user who does not wish to (or cannot) connect to the network is excluded from using this product.

Hasebe, et al (U.S. Pat. No. 5,555,304) describe a system, which is keyed to the individual user and to computer used. This limits an authorized user to the use of the program on a single computer, and severely restricts the users' mobility or ability to upgrade their equipment. Further, while this patent also claims the use of data stored in an un-rewritable area of a disc, the manner in which it is made un-rewritable leaves open the possibility of copying the data (including the "unrewritable" portion) to a fresh disc.

A series of patents by Fite et al (U.S. Pat. Nos. 5,400,319, 5,513,169, 5,541,904, 5,805,549, and 5,930,215) discloses a method of creating a machine-readable serial number code on optical discs by selectively removing the reflective layer from small areas of the disc in a way that creates a definable code. The disadvantage to such a system is that special equipment is required to write this special code.

Kanamaru (U.S. Pat. No. 5,940,505) teaches how a CD-ROM may be copy-protected. However, all embodiments of Kanamaru's invention require auxiliary hardware, either in the form of an integrated circuit or an additional computer board, to decrypt the information on the disc.

O'Connor et al., U.S. Pat. No. 5,745,568 discloses a method and system for securing CD-ROM data for retrieval by a specified computer system. A region of an optical disc is encrypted with a hardware identifier as an encryption key. The hardware identifier is associated to the selected computer hardware. The software program files contained in the CD-ROM are encrypted therein using the hardware identifier as an encryption key. The selected software programs on the CD-ROM are installed on the selected computer by decrypting the software program files using the hardware identifier as an encryption key.

Akiyama et al., U.S. Pat. No. 5,805,699, propose a software copying system which enables copyrighted software recorded in a master storage medium to be copied to a user's target storage medium in a legitimate manner. The master storage medium (i.e., CD-ROM) has a software identifier, and the target storage medium has a storage medium identifier. The two identifiers are sent to a central site, which manages licensing for the rights to copy software products. At the central site, a first signature is generated from the two identifiers which is sent back to the computer user. In the computer of the user a second signature is generated from the same two identifiers. Only when the two signatures coincide with each other can the software programs be copied from the master storage medium to the target storage medium.

Chandra et al., U.S. Pat. No. 4,644,493 discloses a method and apparatus which restricts software distribution used on magnetic media to use on a single computer. The original software contained on the magnetic medium is functionally uncopyable until it is modified by the execution of a program stored in a tamper-proof co-processor, which forms a part of the computer.

Indeck et al., U.S. Pat. No. 5,740,244 discloses an implementation by which a software product on a magnetic medium may first instruct a computer in which it is inserted to read a fingerprint of a specified portion of the product and to compare this fingerprint with a pre-recorded version of the same fingerprint. If the fingerprints match, then the software product may permit the computer to further read and implement the application software stored thereon.

There are various problems associated with these methods. One is that many of them are open to what are known as "hacks," which means that if one user determines the method of decrypting or using the application, it is very easy for that person to disseminate the manner of gaining access to the application. Some methods prevent this problem by making the use of a particular application dependent upon a particular hardware combination. This approach creates a problem of portability. The legitimate user cannot use the application on a computer in a different location. The application may fail to start if users change their hardware configuration, such as by an upgrade.

SUMMARY OF THE INVENTION

It is therefore an object of the present invention to provide a way for providing copy protection that cannot be subverted by a bit-for-bit copying scheme on standard CD-writers, but which can be created on standard CD-mastering and writing equipment.

This object is achieved by a copy-protected optical disc, comprising:

a) a preformed identification number (ID) in the ATIP signal and the subcode which is impressed upon the optical disc and a number of other optical discs during optical disc manufacture;

b) a unique identification number for the optical disc which was written on the optical disc after it is manufactured; and c) an encrypted program written onto the optical disc wherein the encryption of such program is based upon the preformed ID and the unique ID and includes two or more selectable security levels.

This invention prevents the discovery of a generic hack while also providing portability, so that the authorized user is not restricted to using a single computer system. Also unlike much of the prior art it doesn't require a central rights granting facility to be contacted whenever the software is to be used or installed.

The use of both a physically-based key (a preformed ID) and a logically-based key (a unique ID) eliminates a number of methods of duplication. Simple bit-for-bit duplication is avoided because it will not copy the preformed ID, which is encoded in the physical structure of the disc tracks. "Sharing" of software between users or customers is avoided because such shared software will not run without the correct unique ID, even if (as might be the case) both users are using discs with the same preformed ID. This recording method creates an executable file, which is locked. The use of a multiply-written preformed ID allows several levels of security.

DETAILED DESCRIPTION OF THE INVENTION

Figure 1:
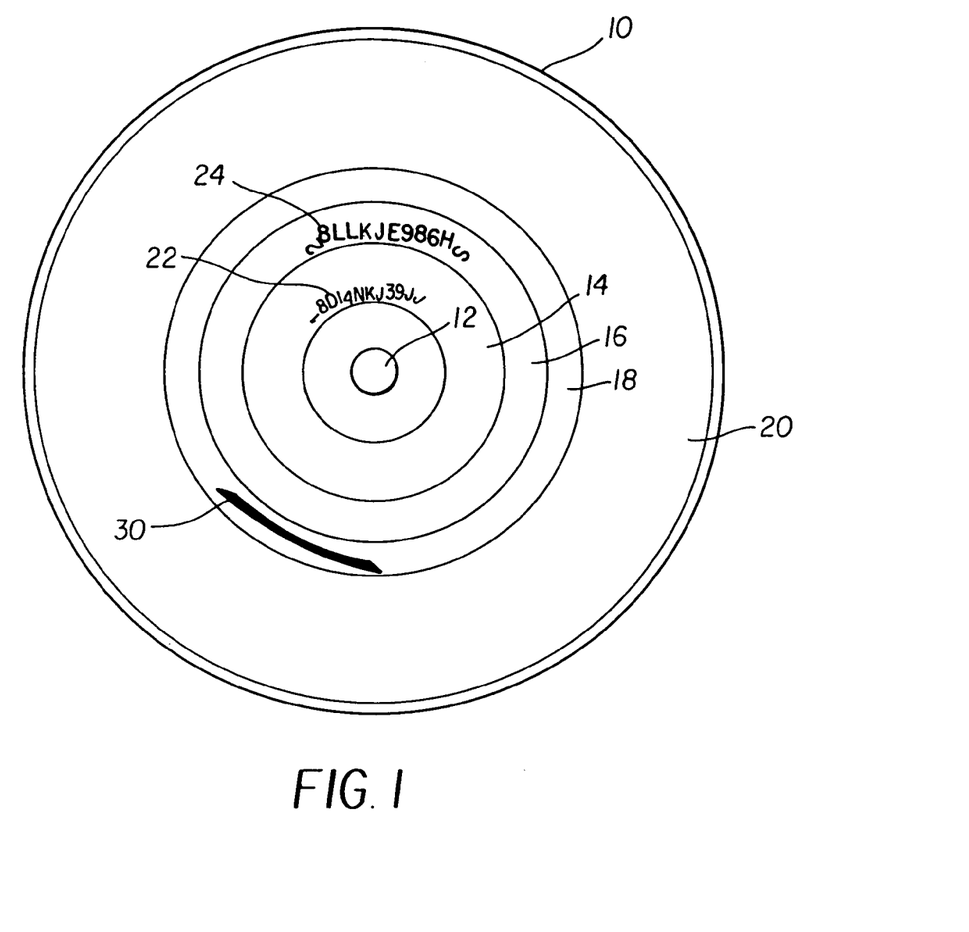
FIG. 1 is a plain view of a compact disc, which has copy protection in accordance with the present invention.

Turning now to FIG. 1, a copy-protected optical disc 10 is shown in accordance with the present invention. It is a Programmable CD-ROM disc, that is, it includes both a mastered pre-recorded area (a ROM area) and a recordable area (a RAM area). It has a hole 12 for a central spindle to spin the disc 10. This particular Programmable CD-ROM disc also includes a first session 14, which has been mastered; that is, a master disc was created including supplied software or data in the first session 14, and was subsequently used, either directly or through intermediate "Father" and "Mother" discs-to stamp multiple copies of the disc 10. The techniques used for mastering a Programmable CD-ROM have already been described in detail in commonly-assigned U.S. patent application Ser. No. 09/662,561 filed Sep. 15, 2000, entitled "System for Making a Photoresist Master of a Hybrid Optical Recording Disc" by Ha et al, the disclosure of which is incorporated herein by reference.

Writable compact optical discs, including Programmable CD-ROM, rely in part on groove modulation. The disc 10 has a continuous spiral track extending from an inner edge to an outer edge of the substrate. The spiral track is usually a groove which provides data channels on the disc 10 and also provides for tracking of the disc 10 while reading or recording data. The groove is oscillated in a direction normal to the groove and is, therefore, referred to as a wobbled groove or a wobble groove. The tracks or grooves of a Programmable CD-ROM optical recording disc, the degree of modulation of the groove, as well as the arrangement of addressing and program data is usually provided in accordance with Orange Book Part II specifications. "Orange Book Part II" is a specification published by Philips International BV which defines key properties of recordable compact disc media and recording performance.

The groove oscillation frequency is modulated with a signal known as Absolute Time In Pre-groove, or ATIP. ATIP contains information about the location of the track relative to the entire recording surface of the optical disc 10. The Orange Book specification is that the ATIP signal is a 22.05 kHz FM signal which carries data at the rate of 3150 bits/second. This data is specified to be 75 42-bit frames per second. In the data area, each frame consists of 4 synchronization bits, 8 bits representing the minute count, 8 bits representing the second count, and 8 bits representing the frame count. The minute, second, and frame counts consist of two 4-bit binary-coded decimal (BCD) numbers. The maximum value for any of these values will be 75, so the most significant bits (MSBs) of each will always be zero in the data region of the disc 10. Thus, the three most significant bits of the minute count, second count, and frame count, concatenated together, will have the binary value of 000. The last 14 bits of each frame serve as CRC (cyclic redundancy check) error protection.

In the disc lead-in area, which is defined as the area of the disc 10 between a diameter of 46 mm and 50 mm, the values of the MSBs will vary from 000. A value of 100 means that the frame contains timecode for the Power Calibration Area, the Program Memory area, or the Lead-In Area, all of which precede the program (recordable) area. Other MSB vales are used to define that the ATIP frame contains special control codes. These codes can be used for example to indicate the optimum writing power for the disc 10, the reference speed, the disc application code, the disc type and sub-type, the start position of the Lead-In Area, or the start position of the Lead Out Area for the disc 10.

In the ROM area of a Programmable CD-ROM optical disc the groove is further modulated in the form of depressions which correspond to disc 10 addressing data and to disc program data. The format in which non-audio information is stored on a CD is known as the "Yellow Book" standard. Under the Yellow Book, digital data on a CD is organized into indexed tracks, interleaved with error correcting codes (so called C1 and C2 error corrections) and subcode data in organized blocks. Throughout the disc 10, the interleaved subcode information defines the current position in minutes, seconds, frames, both with respect to the current track and with respect to the entire disc 10.

A standard CD-ROM mode 1 data sector consists of 12 bytes maincode synchronization field, 3 bytes address, 1 byte mode, 2048 bytes of user data, 4 bytes error detection code, 8 bytes of ZEROS and 276 bytes of error correction code. Such a CD-ROM data sector, i.e. CD block or block, comprises 2352 bytes and is $1/75$ (one seventy-fifth) of a second. The 2352 bytes are carried in 98 Frames, wherein each Frame includes 24 bytes of the data sector. Additionally, each Frame comprises 4 bytes C2 error correction, 4 bytes C1 error correction and 1 byte subcode data. The 1 byte subcode data is divided into 8 subcode channels called Subcode P, Q, R, S, T, U, V, and W fields. Each subcode channel consists of 98 bits that include 2 synchronization bits and 96 data bits, All subcode channels are similar, but have different functions and contents. The first 2 bits of each subcode channel represent the subcode sync patterns S0 and S1. These patterns are necessary to synchronize a CD reader to spin the CD at a constant linear velocity.

The first session 14 (ROM area) of the disc 10 includes a preformed identification number or ID 22, which is a digital signature recorded in the ATIP channel during the mastering process and subsequently pressed into each Programmable CD-ROM disc. The preformed ID is also recorded in the subcode channel and the main data channel. In the ATIP channel, this value is recorded in the Lead-In area using one or more of the special control codes. For example the disc application code, the disc type, the optimum writing power for the disc 10, the reference speed, the start position of the Lead-In Area (recorded in special information 2 as defined by the Orange Book), the start position of the Lead Out Area (recorded in special information 3 as defined by the Orange Book), or any other of the special or additional information designated by the Orange Book can be set to specific values known to the disc manufacturer. These values can be used separately or in combination to calculate a preformed ID 22 code. In addition, a preformed ID 22 code can be stored in one or more subcode data channels of the lead-in. These codes are also repeated within the main data channel at a specific sector with a known absolute address.

The disc 10 also includes a second session 16 that was written using recordable optical disc techniques, such as a CD-WO or CD-RW writer. The disc 10 can also include a third session 18, or even subsequent written sessions. The disc 10 can also include a user-recordable area 20. Included in the recorded sessions is a unique identification number or ID 24 that is written to the second session in one or more known absolute sector addresses, and an encrypted executable package 30.

Figure 2:
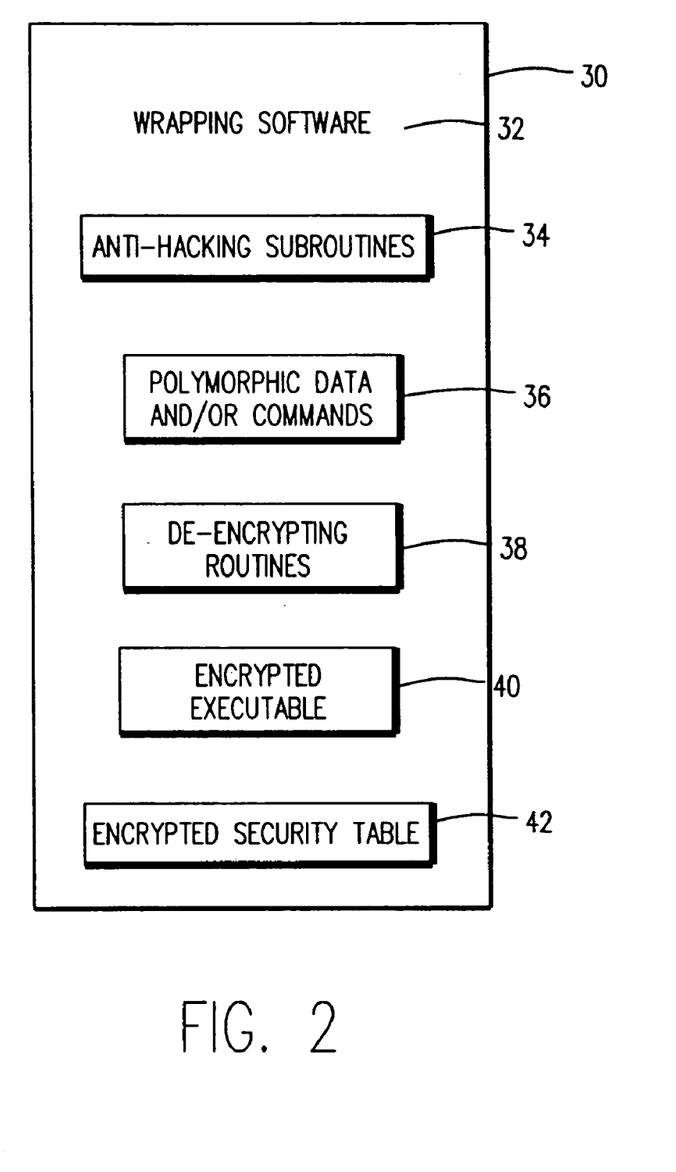
FIG. 2 is a schematic diagram of the software technique to encrypt the application in a non-copyable way.

Turning next to FIG. 2, we see a diagram of one way of encrypting the executable program for use in this invention. An executable package is written to the disc 10. It includes the original executable that has been encrypted. The encrypted package includes a single executable program 30, which has the same name on the disc 10 as the original executable program 40. The package 30 includes wrapping software 32 which runs first. The package also includes subroutines 34 to check for the presence of hacking software in memory when the program is run. There is also a polymorphic section 36 that comprises data or commands or both. Polymorphic code generally provides multiple paths which achieve the same results, but are constructed in such a way that a program follows a different path each time it executes. Polymorphic code is used to make the program more difficult to reverse-engineer. De-encrypting routines 38 are designed to use the data stored on the Programmable CD-ROM (specifically the preformed ID 22 and the unique ID 24) to de-encrypt the executable 40 and the security table 42.

Figure 3:
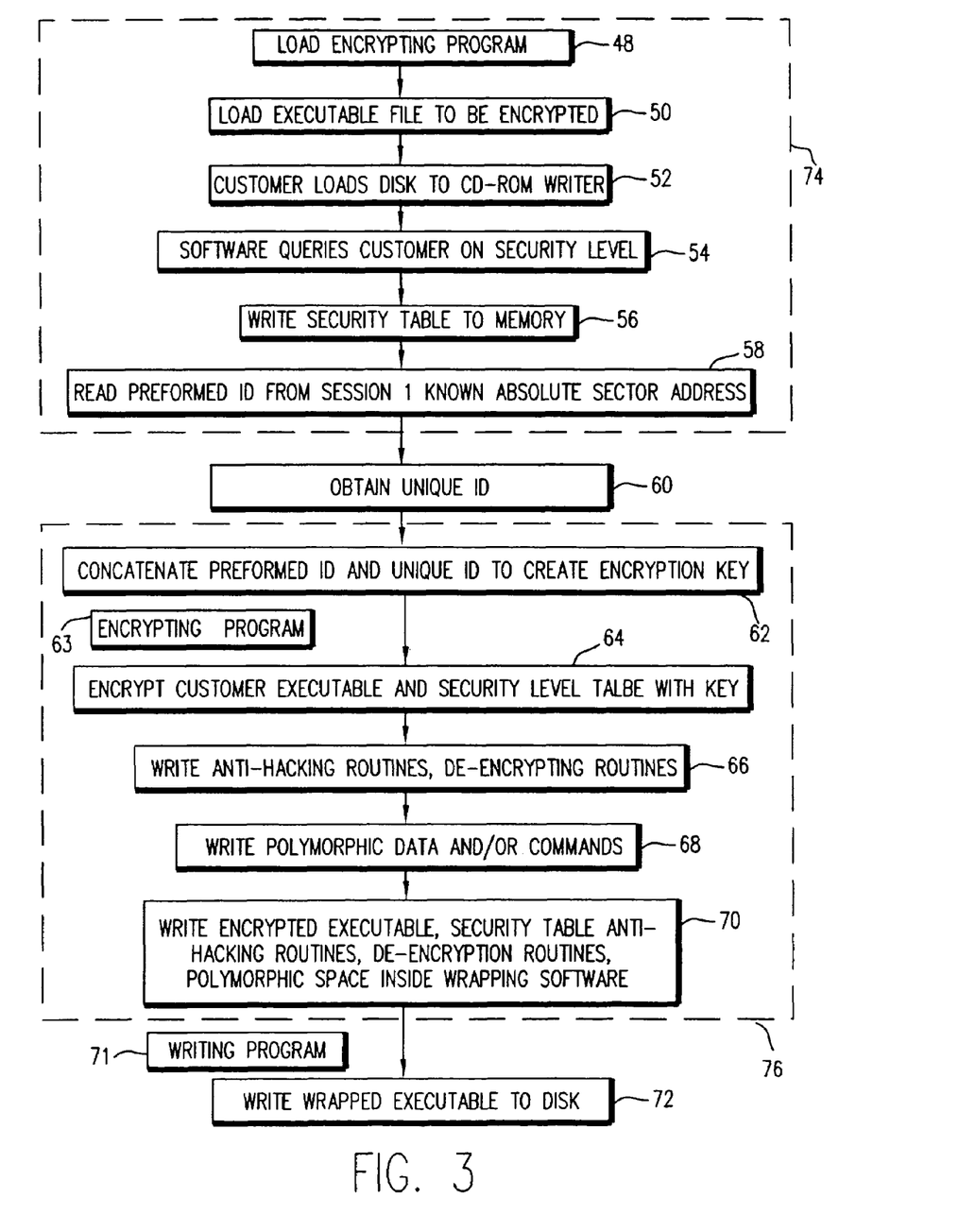
FIG. 3 is a block diagram showing the steps for creating the encrypted software.

Turning next to FIG. 3, we see the steps necessary to encrypt the user executable program, using the special properties of the Programmable CD-ROM to encrypt it. This may be used in a number of different embodiments of this invention that will be detailed in this application. In step 48, the encrypting program, which may be mastered onto the Programmable CD-ROM or located on a local hard drive or on a distributed network, is read into the memory of a computer. In step 50, the executable file that requires encryption is read into memory. The customer, here defined as a person or entity using programmable CD-ROM to distribute a software application, puts the mastered Programmable CD-ROM disc into the CD-ROM writer in step 52.

The customer starts by designating the files to be encrypted. These files may include both data and executable programs or just executable programs. The customer then designates the level of security that is desired for each file (Step 54) and creates a table containing the security information (Step 56).

The customer then enters information corresponding to the preformed ID 22 and the unique ID 24 of the particular Programmable CD-ROM disc on which the encrypted software is to be written. In another preferred embodiment these values are read from the Programmable CD-ROM from any of the locations where they are recorded. When the security software has obtained the preformed ID 22 and the unique ID 24, it puts them together to create an encryption key in step 62. Encrypting program 63 uses this encryption key in step 64 to encrypt the executable file and the security level table. The files that were encrypted in step 64 are then added as data files to a wrapper program in step 70. The wrapper program includes the subroutines required to read the preformed ID 22 and the unique ID 24 from the disc 10 as allowed by the designations in the security table, subroutines to detect the presence of reverse engineering tools in the memory of the computer where the program is running and to stop execution if they are detected, and the subroutines that decrypt and launch the execution of the software application. In step 72, the wrapped executable package is written to the Programmable CD-ROM disc in a writable session (16 or 18).

Cryptography and cryptographic functions are well known in the art. A good description can be found in Applied Cryptography, B. Schneier, John Wiley and Sons, Inc., New York, 1996, the contents of which is incorporated herein by reference. In our example, we will use the following notation:

TABLE 1

Cryptographic notation

| Symbol | Meaning |
|--------|---------|
| P | Program to be encrypted |
| E | Encrypting function |
| B | Preformed ID |
| U | Unique ID |
| I | Concatenated ID = BU |
| X | Encrypted program = E(P,I) |

Any encryption function may be used for this invention which satisfies the following properties: the computation E(P,I) is feasible, i.e. E is computable in polynomial time; the polynomial time algorithm for calculation of $E^{-1}(X,I)$ is known and is feasible; the encryption function E (and its decryption counterpart $E^{-1}$) uses a variable key I which is supplied at the time of computation; and the likelihood of producing a wrong program P' through the encryption/decryption process (i.e. $P'=E^{-1}\{E(P,I),I\}$) is exceedingly small.

Encryption follows the steps:
1. The preformed ID B and the unique ID U are obtained;
2. The two ID's are concatenated I=BU to give the encryption/decryption key I;
3. The concatenated ID is used by the encryption algorithm E to calculate the encrypted program, X=E(P,I).

Decryption follows the steps:
1. The preformed ID B and the unique ID U are obtained;
2. The two ID's are concatenated I=BU to give the encryption/decryption key I;
3. The concatenated ID is used by the decryption algorithm $E^{-1}$ to calculate the original program, $P=E^{-1}(X,I)$.

Figure 4:
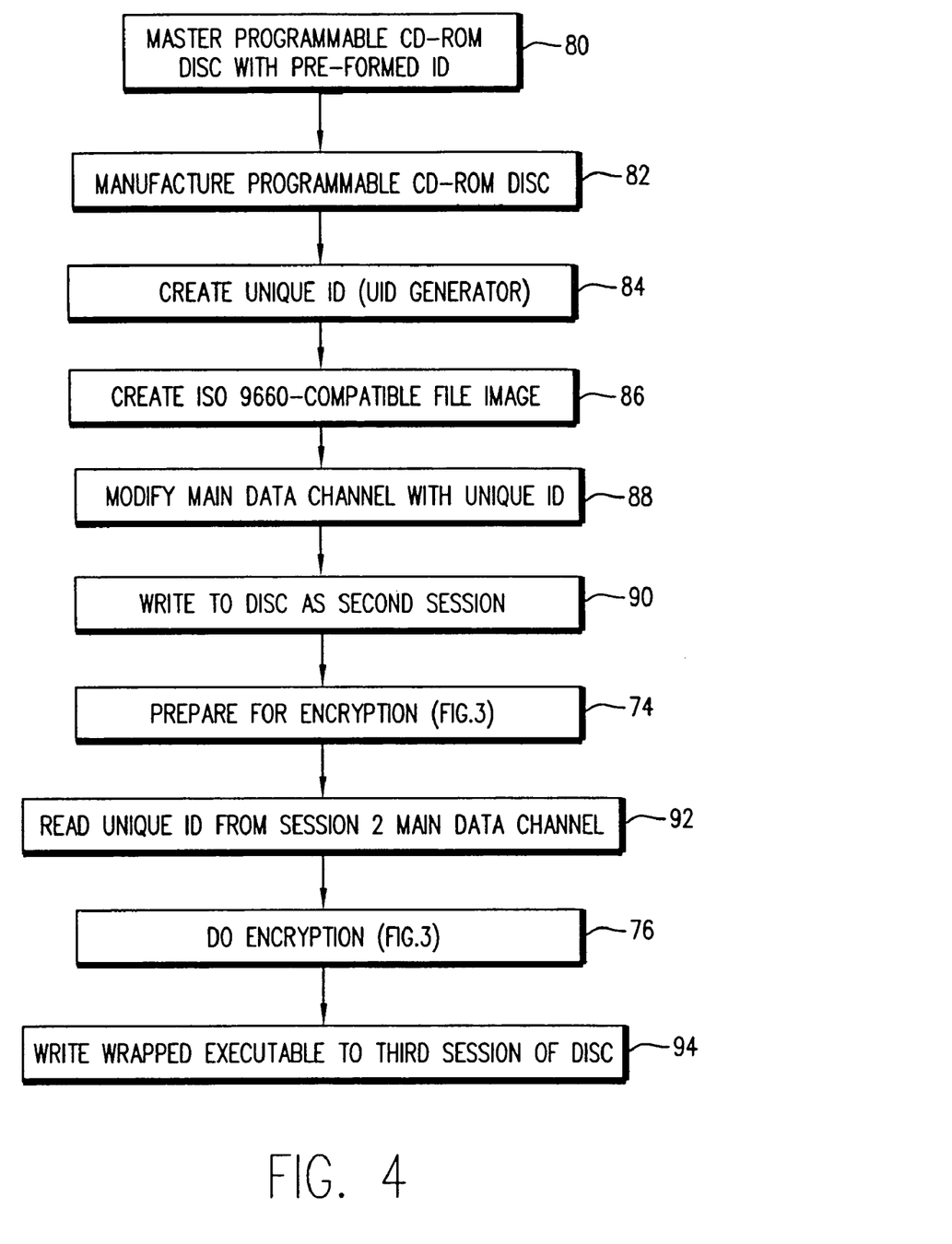
FIG. 4 is a block diagram, which shows one embodiment of how a CD is provided with copy protection.

Turning next to FIG. 4, a block diagram for a first embodiment for practicing this invention is described. A Programmable CD-ROM disc is mastered (Step 80) using any of several well known mastering techniques for mastering compact discs. See, for example, the above-cited commonly-assigned U.S. patent application Ser. No. 09/662,561 to Ha et al.. The Programmable CD-ROM includes a first session 14, although it can also include other mastered sessions as well. Included in the master disc is a preformed ID 22. The master disc is then used in step 82 for the manufacture of Programmable CD-ROM discs by standard stamping methods. At this point, a large number of identical Programmable CD-ROM discs exist.

The discs 10 are then written with individual identification. A unique ID 24 is created in step 84. The unique ID 24 can be a sequentially designated number that is determined by the order of manufacturing of the disc 10, or it can be a completely random number, or it can be chosen from a table of numbers that was created beforehand. In another preferred embodiment, the number is further processed by an algorithm that allows the generation of the actual number in such a way that valid numbers correspond to only a small part of the range of possible numbers. In this case, a valid number can only be generated by those knowing the generation algorithm. Also in this case it is possible to provide a checking algorithm to allow a number to be validated for example by use of well known public key, private key encryption and signing techniques. In another embodiment, the number is generated from a hardware identification and linked to a particular computer. (See, for example, O'Connor et al., U.S. Pat. No. 5,745,568, the disclosure of which is incorporated herein.) In another embodiment, the unique ID 24 could be tied to a particular application, and therefore the same unique identification number could be used on multiple discs 10. The unique ID 24 is then used to create (step 86) an ISO 9660-compatible file image which will become a written session. The main-channel data for a known absolute sector address of this session is modified (step 88) with the unique ID 24, and in step 90 the session is written, not pressed, to the disc 10 as a second session 16. If needed, this session could be written as a third or later session instead. At this point, each disc 10 contains its own identification and is unique.

The customer then prepares the disc 10 for encryption. This is shown schematically as step 74 and comprises several steps, carried out by the security software, which were described in more detail in FIG. 3. The unique ID 24 is read (Step 92) from a known absolute sector address in the second session 16. This is then used with the preformed ID 22 to do the encryption. The encryption is shown diagrammatically as step 76, and comprises a number of steps which were described in more detail in FIG. 3. After the encryption is complete, the wrapped executable is written to a third session 18 on the disc 10 (Step 94).

Figure 5:
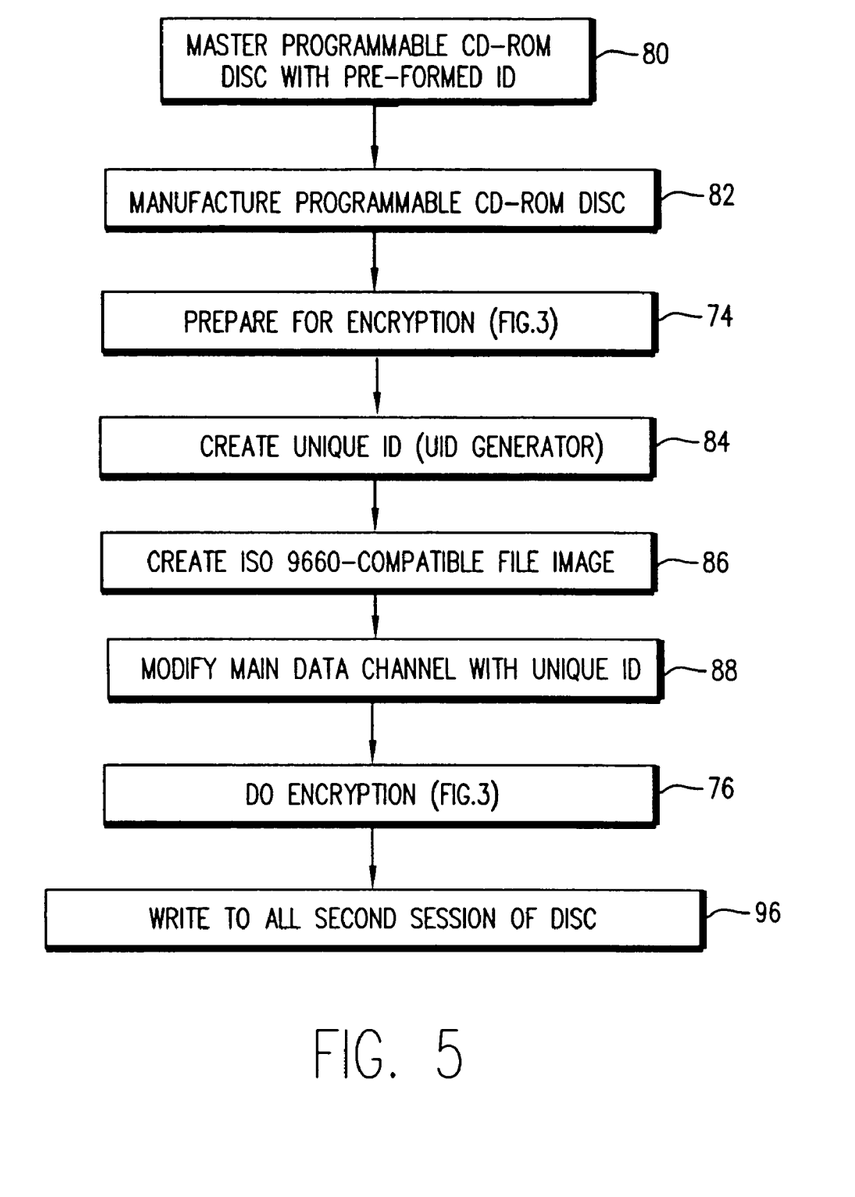
FIG. 5 is a block diagram, which shows another embodiment of how a CD is provided with copy protection.

Turning now to FIG. 5, we see a block diagram for a second embodiment of this invention in which the unique ID 24 and the encrypted executable 40 are written to the same session. It includes many of the same steps as described in FIG. 4, but the order varies. A Programmable CD-ROM disc is mastered (Step 80) using any of several well known mastering techniques for mastering compact discs. See, for example, the above-cited commonly assigned U.S. patent application Ser. No. 09/662,561 to Ha et al. The Programmable CD-ROM includes a first session 14, although it can also include other mastered sessions as well. Included in the master disc 10 is a preformed ID 22. The master disc is then used in step 82 for the manufacture of Programmable CD-ROM discs by standard stamping methods. At this point, a large number of identical Programmable CD-ROM discs exist.

The customer then prepares the disc 10 for encryption. This is shown schematically as step 74 and comprises several steps, carried out by the security software, which were described in more detail in FIG. 3. A unique ID 24 is then created in step 84. The unique ID 24 can be a completely random number or it can be chosen from a table of numbers that was created beforehand. The unique ID 24 is then used to create (step 86) an ISO 9660-compatible file image which will become part of a written session. The main-channel data for a known absolute sector address of this session is modified (step 88) with the unique ID 24. The unique ID 24 is also used, along with the preformed ID 22 read in step 74, to do the encryption. The encryption is shown diagrammatically as step 76, and comprises a number of steps which were described in more detail in FIG. 3. After the encryption is complete, the unique ID 24 and the wrapped executable are written to a second session on the disc 10.

Figures 6, 6A:
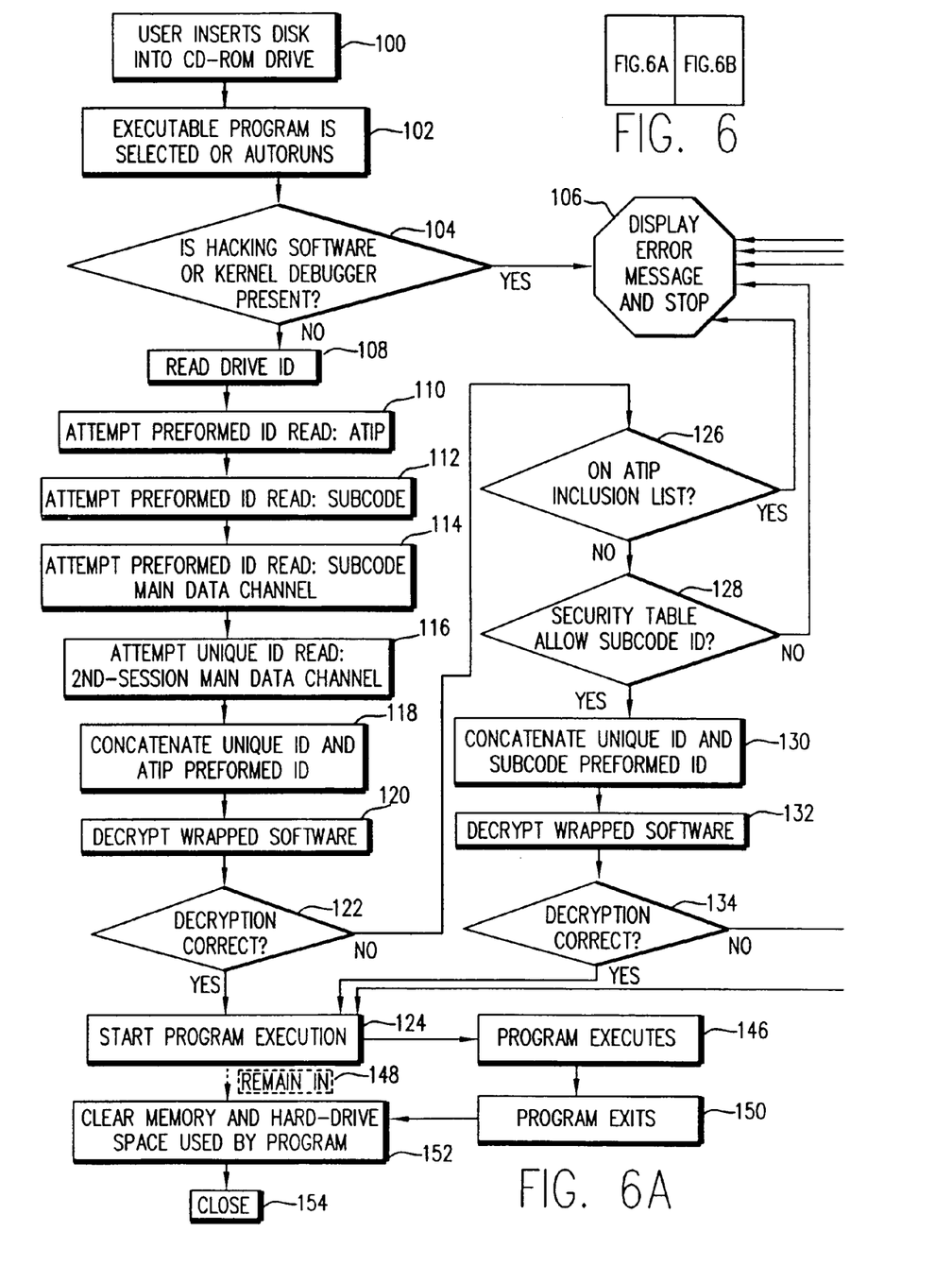
FIG. 6 is a block diagram which shows how the copy-protection scheme works when is CD is read.
Figure 6B:
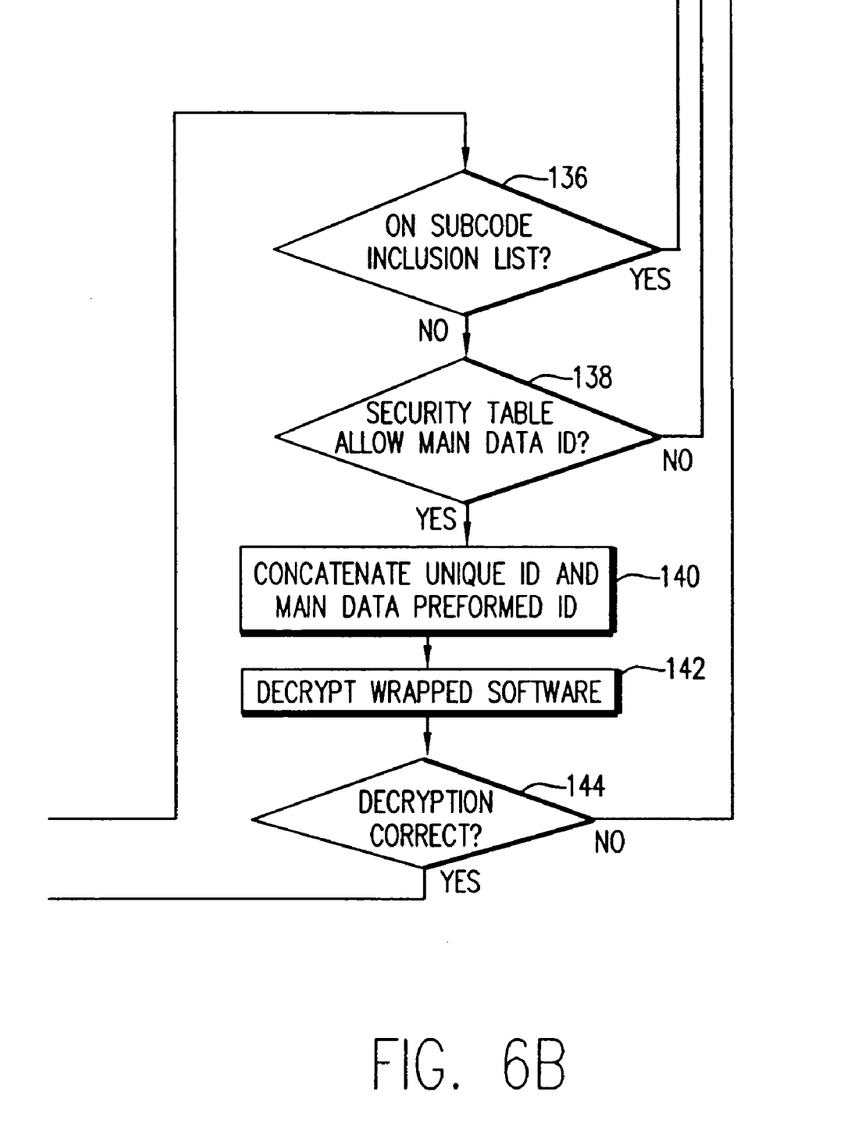
Figure 7:
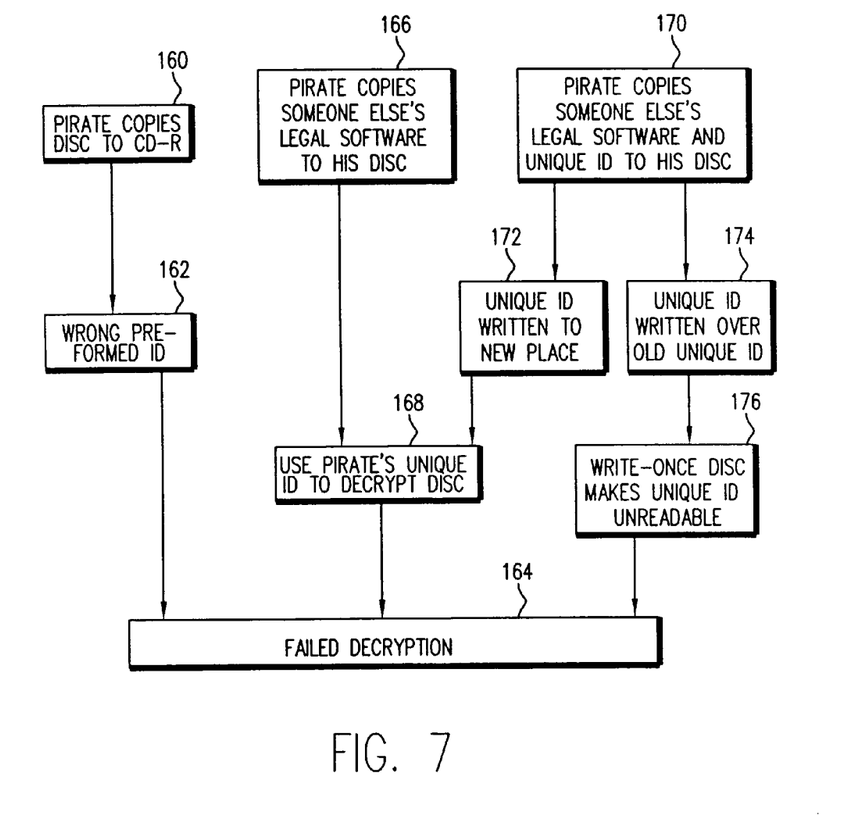
FIG. 7 is a block diagram which shows how the copy protection herein described resists ways to circumvent it.

Turning now to FIG. 6, a method is shown by which this invention is designed to operate in the hands of the end-user. The end-user first inserts (step 100) the disc 10 into a CD-ROM, CD-R, or CD-RW drive. An executable program on the disc 10 runs automatically or is selected (step 102). The program first uses the anti-hacking subroutines 34 to check for hacking or kernel-debugging software that can be used to defeat copy-protection schemes (step 104). If such a program is present, the program displays an error message to the user and stops automatically (step 106).

If no such hacking software is present on the end-user's system, the decryption program reads the Drive ID in step 108. In step 110, the decryption program issues a command to the drive to read the preformed ID 22 from the ATIP signal. The decryption program then issues a command (step 112) for the drive to read the preformed ID 22 from the subcode. In step 114, the decryption program issues a command to read the preformed ID 22 from a known absolute sector address of the main data channel. Finally, in step 116, the decryption program issues a command to the drive to read the unique ID 24 from a known absolute sector address of the second (or later) session main data channel.

In step 118, the decryption program concatenates the unique ID 24 that was read in step 116 and the preformed ID 22 that was read from the ATIP in step 110. It then uses the concatenated result as a decryption key to decrypt the wrapped software 32 in step 120. The program then determines (step 122) if the decryption was valid. There are several ways of doing this, e.g. looking for a flag in the decrypted program or checking if operating-system-specific code is present in the decrypted executable. If the decryption was successful, the original executable is then started (step 124).

If the decryption was unsuccessful, the decryption program uses the Drive ID that was read in step 108 to determine if the drive should be able to read the ATIP (step 126). If the drive is on the ATIP inclusion list (that is, it should be able to read the ATIP), the program displays an error message to the user and stops (step 106). If the drive is not on the ATIP inclusion list, the decryption program then consults (step 128) the security table that was recorded in step 56. If the security level of the program has been set to the highest level, the preformed ID 22 in the subcode is not allowed to be used and the program displays an error message to the user and stops (step 106). If the preformed ID 22 from the subcode is allowed, the decryption program concatenates (step 130) the unique ID 24 that was read in step 116 and the preformed ID 22 that was read from the subcode in step 112. It then uses the concatenated result as a decryption key to decrypt the wrapped software 32 in step 132. The program then determines (step 134) if the decryption was valid. If the decryption was successful, the original executable is then started (step 124).

If the decryption was unsuccessful, the decryption program uses the Drive ID that was read in step 108 to determine if the drive should be able to read the subcode (step 136). If the drive is on the subcode inclusion list (that is, it should be able to read the subcode), the program displays an error message to the user and stops (step 106). If the drive is not on the subcode inclusion list, the decryption program then consults (step 138) the security table that was recorded in step 56. If the security level of the program has been set to a high level, the preformed ID 22 in the main data is not allowed to be used and the program stops (step 106). If the preformed ID 22 from the main data is allowed, the decryption program concatenates (step 140) the unique ID 24 that was read in step 116 and the preformed ID 22 that was read from the main data in step 114. It then uses the concatenated result as a decryption key to decrypt the wrapped software 32 in step 142. The program then determines (step 144) if the decryption was valid. If the decryption was successful, the original executable is then started (step 124). If the decryption was unsuccessful, an error message is displayed to the user and the program—and the entire process—stops (step 106).

At any point at which the decryption was successful (step 122, 134, or 144), the original executable is then started (step 124). The decryption program remains in the background (step 148) while the program executes (step 146) and exits (step 150). Once the original program exits, the decryption program clears the memory and hard-drive space used by the original program (step 152) and then closes down (step 154).

The invention has been described in detail with particular reference to certain preferred embodiments thereof, but it will be understood that variations and modifications can be effected within the spirit and scope of the invention.

PARTS LIST

10 Compact disc in accordance with this invention
12 Center hole
14 First session of the disc, pressed in the manufacturing process
16 Second session of the disc; start of writable area
18 Third session of the disc
20 User-writable area of the disc (optional)
22 Preformed identification number
24 Unique identification number
30 Encrypted executable package
32 Wrapping software
34 Anti-hacking routines
36 Polymorphic data and/or commands
38 De-encrypting routines
40 Encrypted executable
42 Encrypted security table
48 Block
50 Block
52 Block
54 Block
56 Block
58 Block
60 Block
62 Block
64 Block
66 Block
68 Block
70 Block
72 Block
74 Inclusive block
76 Inclusive block
80 Block
82 Block
84 Block
86 Block
88 Block
90 Block
92 Block
94 Block
96 Block
100 Block
102 Block
104 Decision block
106 Stop block
108 Block
110 Block
112 Block
114 Block
116 Block
118 Block
120 Block
122 Decision block
124 Block
126 Decision block
128 Decision block
130 Block
132 Block
134 Decision block
136 Decision block
138 Decision block
140 Block
142 Block
144 Decision block
146 Block
148 Static Block
150 Block
152 Block
154 Block
160 Block
162 Block
164 Block
166 Block
168 Block
170 Block
172 Block
174 Block
176 Block

What is claimed is:

1. A copy-protected optical disc, comprising:
   a) a preformed identification number (ID) in the ATIP signal and the subcode which is impressed upon the optical disc and a number of other optical discs during optical disc manufacture;
   b) a unique identification number for the optical disc which was written on the optical disc after it is manufactured; and
   c) an encrypted program written onto the optical disc wherein the encryption of such program is based upon the preformed ID and the unique ID and includes two or more selectable security levels.

2. The copy-protected optical disc of claim 1 further including the preformed ID impressed in the main channel data stream.

3. A method for copy-protecting information recorded on an optical disc, comprising the steps of:
   a) forming a master disc that includes a preformed identification number (ID) recorded in the ATIP signal and the subcode, and forming a number of optical discs which have the ID duplicated from the master disc;
   b) writing a unique ID for the optical disc onto such optical disc; and
   c) writing an encrypted program onto the optical disc wherein the encryption of such program is based upon the preformed ID and the unique identification number.

4. The method of claim 3 further including the preformed ID recorded in the data stream.

5. The method of claim 3 wherein the preformed ID includes the maximum start of lead-in and the start of lead-out for the disc, and is recorded in special information and special information of the ATIP signal.

6. The method of claim 3 further including the step of reading the preformed ID and the unique ID from the disc and decrypting the encrypted program using the preformed ID and the unique ID.

7. The copy-protected optical disc of claim 1 in which the unique ID is recorded at one or more known absolute sector addresses on the disc.

8. The copy-protected optical disc of claim 1 in which the unique ID is recorded into the second session.

9. The copy-protected optical disc of claim 1 in which the disc further includes a recordable area.

10. A copy-protection system including a computer, the copy-protected optical disc of claim 1, and an encrypting program capable of reading the preformed ID and the unique ID from the copy-protected optical disc of claim 1 and encrypting a customer program using them.

11. The method of claim 3 wherein the encryption is performed by a copy-protection system including a computer, the copy-protected optical disc of claim 1, and an encrypting program capable of reading the preformed ID and the unique ID from the copy-protected optical disc of claim 1 and encrypting a customer program using them.

12. The copy-protected optical disc of claim 1 in which an encrypting program is pressed onto the copy-protected optical disc.

13. The copy-protection system of claim 10 in which the encrypting program is located on another computer system or on a network.

14. The method of claim 11 further including:
   a) reading the Drive ID of the CD-ROM drive to determine whether it is a reader/writer or a reader only; and
   b) using that information to determine which preformed ID may be used in accordance with the predetermined security level.

15. The method of claim 11 including two or more selectable security levels.

16. The method of claim 6 with the decrypting program reading the preformed ID from the ATIP signal.

17. The method of claim 6 with the decryption program reading the preformed ID from the subcode of the disc.

18. The method of claim 6 with the decryption program reading the preformed ID from at least one known absolute sector address.

19. The copy-protected optical disc of claim 1 in which valid values of the unique ID correspond to only a small part of the range of possible numbers.

* * * * *